(12) United States Patent
Kishimoto et al.

(10) Patent No.: US 9,841,063 B2
(45) Date of Patent: Dec. 12, 2017

(54) MULTIPLE DISC CLUTCH APPARATUS

(71) Applicant: KABUSHIKI KAISHA F.C.C., Hamamatsu-shi, Shizuoka (JP)

(72) Inventors: Naoki Kishimoto, Hamamatsu (JP); Hideyuki Oishi, Hamamatsu (JP); Shinji Furuhashi, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 203 days.

(21) Appl. No.: 14/752,401

(22) Filed: Jun. 26, 2015

(65) Prior Publication Data
US 2015/0292567 A1 Oct. 15, 2015

Related U.S. Application Data

(63) Continuation of application No. PCT/JP2013/084670, filed on Dec. 25, 2013.

(30) Foreign Application Priority Data

Dec. 27, 2012 (JP) .................................. 2012-286016

(51) Int. Cl.
  *F16D 13/52* (2006.01)
  *F16D 13/64* (2006.01)
  *F16D 13/72* (2006.01)
(52) U.S. Cl.
  CPC ........... *F16D 13/648* (2013.01); *F16D 13/52* (2013.01); *F16D 13/72* (2013.01)
(58) Field of Classification Search
  None
  See application file for complete search history.

(56) References Cited

U.S. PATENT DOCUMENTS

| 5,094,331 | A | * | 3/1992 | Fujimoto | ................ F16D 13/74 192/107 R |
| 2008/0190726 | A1 | * | 8/2008 | Sayama | ................ F16D 13/04 192/107 R |

(Continued)

FOREIGN PATENT DOCUMENTS

| DE | 19821416 | 6/1999 |
| EP | 1 234 993 A1 | 8/2002 |

(Continued)

OTHER PUBLICATIONS

Extended Search Report dated Sep. 6, 2016, received in European Patent Application No. 13869626.5.

*Primary Examiner* — Huan Le
*Assistant Examiner* — Lori Wu
(74) *Attorney, Agent, or Firm* — Knobbe Martens Olson & Bear, LLP (57) ABSTRACT

A multiple disc clutch apparatus configured to reduce the drag torque, the sticking torque, and simultaneously the weight of the multiple disc clutch apparatus. The apparatus can comprise substantially annular multiple clutch discs connected to an input-side from an engine; substantially annular multiple clutch plates alternately laminated with the clutch discs and connected to an output-side to a wheel; and frictional members secured on surfaces of the clutch discs opposing the clutch plates and adapted to press-contact with or separate from the clutch plates. A power from the engine can be transmitted to the wheel when the clutch discs and plates are press-contacted with each other; the power transmission being blocked by releasing the press-contacting force; wherein depressions are formed on each clutch plate along its periphery and radially inward therefrom; and wherein a part of the one or more frictional members is positioned within a region of the depressions.

8 Claims, 9 Drawing Sheets

(56) References Cited

U.S. PATENT DOCUMENTS

| | | | | |
|---|---|---|---|---|
| 2009/0038905 A1* | 2/2009 | Schrader | ................. | F16D 13/72 |
| | | | | 192/70.12 |
| 2014/0110199 A1* | 4/2014 | Tokumasu | ............ | F16D 13/648 |
| | | | | 188/218 XL |
| 2014/0166427 A1* | 6/2014 | Youngwerth | ........... | F16D 13/72 |
| | | | | 192/109 R |

FOREIGN PATENT DOCUMENTS

| | | |
|---|---|---|
| JP | H01-146018 | 10/1989 |
| JP | H2001-234946 | 8/2001 |
| JP | H2011-174597 | 9/2011 |
| JP | 2012-229765 | 11/2012 |

* cited by examiner

MULTIPLE DISC CLUTCH APPARATUS

INCORPORATION BY REFERENCE TO ANY PRIORITY APPLICATIONS

Any and all applications for which a foreign or domestic priority claim is identified in the Application Data Sheet as filed with the present application, or any corrections thereto, are hereby incorporated by reference under 37 CFR 1.57.

BACKGROUND

Technical Field

The present disclosure relates to multiple disc clutch apparatuses which can transmit a power from an engine to a wheel or wheels when clutch discs and clutch plates are press-contacted to each other via frictional members and which can block (e.g., disconnect and/or prevent transmission of) the power transmission between the engine and the wheel (or wheels) when the press-contacting force is released.

Description of the Related Art

In general, a multi disc clutch apparatus for vehicles such as a motorcycle is intended to arbitrarily perform transmission and/or blocking of a driving power of an engine to and/or from a driving wheel and comprises substantially annular multiple clutch discs connected to an input-side from an engine and substantially annular multiple clutch plates alternately laminated with (e.g., interleaved with) the clutch discs and connected to an output-side to a wheel. Frictional members (e.g., formed of cork material) are secured on surfaces of the clutch discs opposing the clutch plates and the clutch apparatus can be adapted to transmit the power between the engine-side and the wheel-side by press-contacting the clutch discs with the clutch plates via the frictional members. The clutch apparatus can be adapted to block the power transmission by releasing the press-contacting force.

As disclosed in, for example, Japanese Patent Document JP03-146018A, a multiple disc clutch apparatus of the prior art has been proposed in which radially extending grooves are formed on each clutch disc at portions near the frictional members. According to this prior art, since inside oil can be discharged outside through the radially extending grooves when the clutch discs and the clutch plates are relatively rotated, it is possible to reduce the drag torque which would be caused by the viscous resistance of oil remained between the clutch discs and the clutch plates when they are separated by releasing the press-contacting force.

SUMMARY

In this multiple disc clutch apparatus of the prior art, the provision of the radially extending grooves can somewhat contribute to reduction of the drag torque. However, further improvement of the oil discharging effect between the clutch discs and clutch plates is needed in order to further reduce the drag torque. In addition to the reduction of the drag torque, it is desirable to reduce the sticking torque caused just before the relative rotation of the clutch discs and the clutch plates, as well as to reduce the weight of the multiple disc clutch apparatus.

It is, therefore, an object of at least one of the present inventions to provide a multiple disc clutch apparatus which can reduce both the drag torque and the sticking torque, and simultaneously reduce the weight of the multiple disc clutch apparatus.

Thus, in some embodiments, a multiple disc clutch apparatus can include substantially annular multiple clutch discs connected to an input-side from an engine. The apparatus can include substantially annular multiple clutch plates to be alternately laminated with (e.g., interleaved with) the clutch discs and connected to an output-side configured to output to a wheel. The apparatus can include frictional members secured on surfaces of the clutch discs opposing the clutch plates and configured to press-contact with and/or separate from the clutch plates. A power from the engine can be transmitted to the wheel when the clutch discs and the clutch plates are press-contacted to each other via the frictional members. The power transmission between the engine and the wheel can be blocked (e.g., disconnected and/or cutoff) by releasing the press-contacting force. Depressions can be formed on each clutch plate extending along its periphery and radially inward therefrom. A part of the frictional members can be positioned within a region of the depressions.

In some embodiments, each of the depressions has a configuration of a curved notch.

In some embodiments, the depressions are multiple notches arranged equidistantly along the whole periphery of the clutch plate.

In some embodiments, the frictional members comprise multiple rectangular members secured on surfaces of the clutch discs opposing the clutch plates separately from each other at a predetermined distance so as to discharge oil between the clutch disc and the clutch plate through separated spaces between the frictional members.

DETAILED DESCRIPTION

Embodiments of the present inventions will be hereinafter described with reference to the accompanying drawings.

Figure 1:
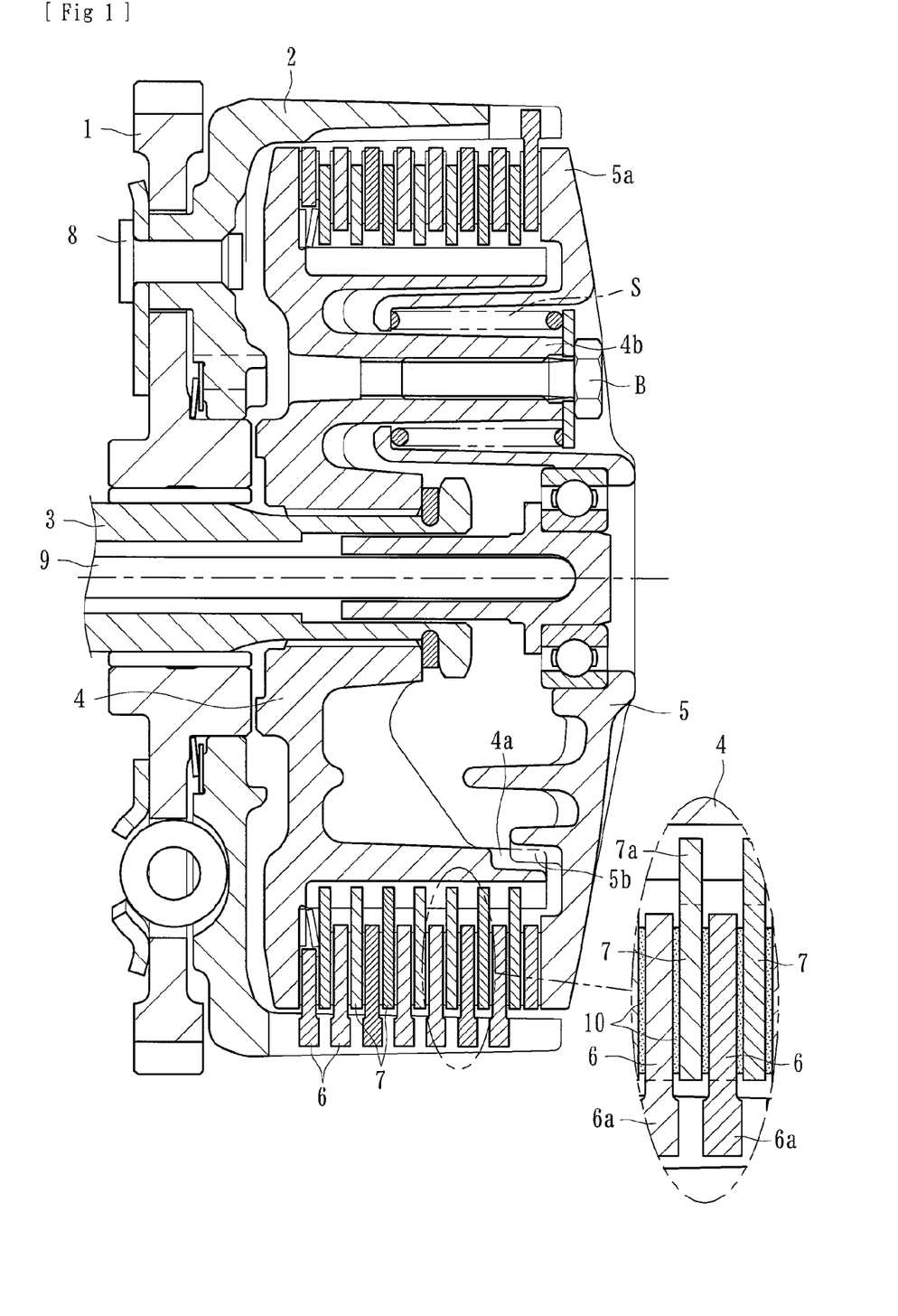
FIG. 1 is a longitudinal section view of a multiple disc clutch apparatus according to the present disclosure.

A multiple disc clutch apparatus can be mounted on a vehicle (e.g., a motorcycle or other vehicle) to arbitrarily (e.g., selectively, at any time, and/or in response to user input) transmit or block (e.g., disconnect and/or prevent transmission of) the driving power of an engine or a transmission to or from a wheel (e.g., a driving wheel). As shown in FIG. 1, the multiple disc clutch apparatus can include a clutch housing 2 forming an input-side of the apparatus configured to receive input from the engine and to rotate about an axis of rotation upon input from the engine. A gear 1 can be mounted on the clutch housing 2. The clutch apparatus can include a clutch member 4 forming an output-side of the apparatus configured to output power to the wheel. The clutch member 4 can be connected to a shaft 3. The clutch apparatus can include a presser 5 mounted on the left end (e.g., in the frame of reference of FIG. 1) of the clutch member 4, clutch discs 6 mounted on the clutch housing 2, and clutch plates 7 mounted on the clutch member 4

The gear 1 can be connected to the clutch housing 2 via rivets 8 or other connection structure. The gear 1 can be rotated around the shaft 3 when driving power (e.g., rotational power) from the engine is inputted thereto. The clutch housing 2 can be formed as a cylindrical casing opened at its right end (e.g., in the frame of reference of FIG. 1) and multiple clutch discs 6 can be mounted on the inner circumference of the clutch housing 2. Each of the clutch discs 6 can comprise a substantially annular metal plate and can be adapted to be spline engaged with the clutch housing 2 via projections 6a formed on the outer circumference of the clutch discs 6 and splines formed on the clutch housing 2. This can enable the clutch discs 6 to rotate together with the clutch housing 2 and to slide axially therealong.

The clutch member 4 can comprise a cylindrical casing member opened at its right side (e.g., in the frame of reference of FIG. 1) and can be adapted to be contained in the clutch housing 2. The shaft 3 can be passed through the center of the clutch member 4 and can be connected thereto via spline fitting so as to be rotated together with the clutch member 4. The outer circumference of the clutch member 4 can be formed with axially extending splines on which the clutch plates 7 are fitted.

Figure 3:
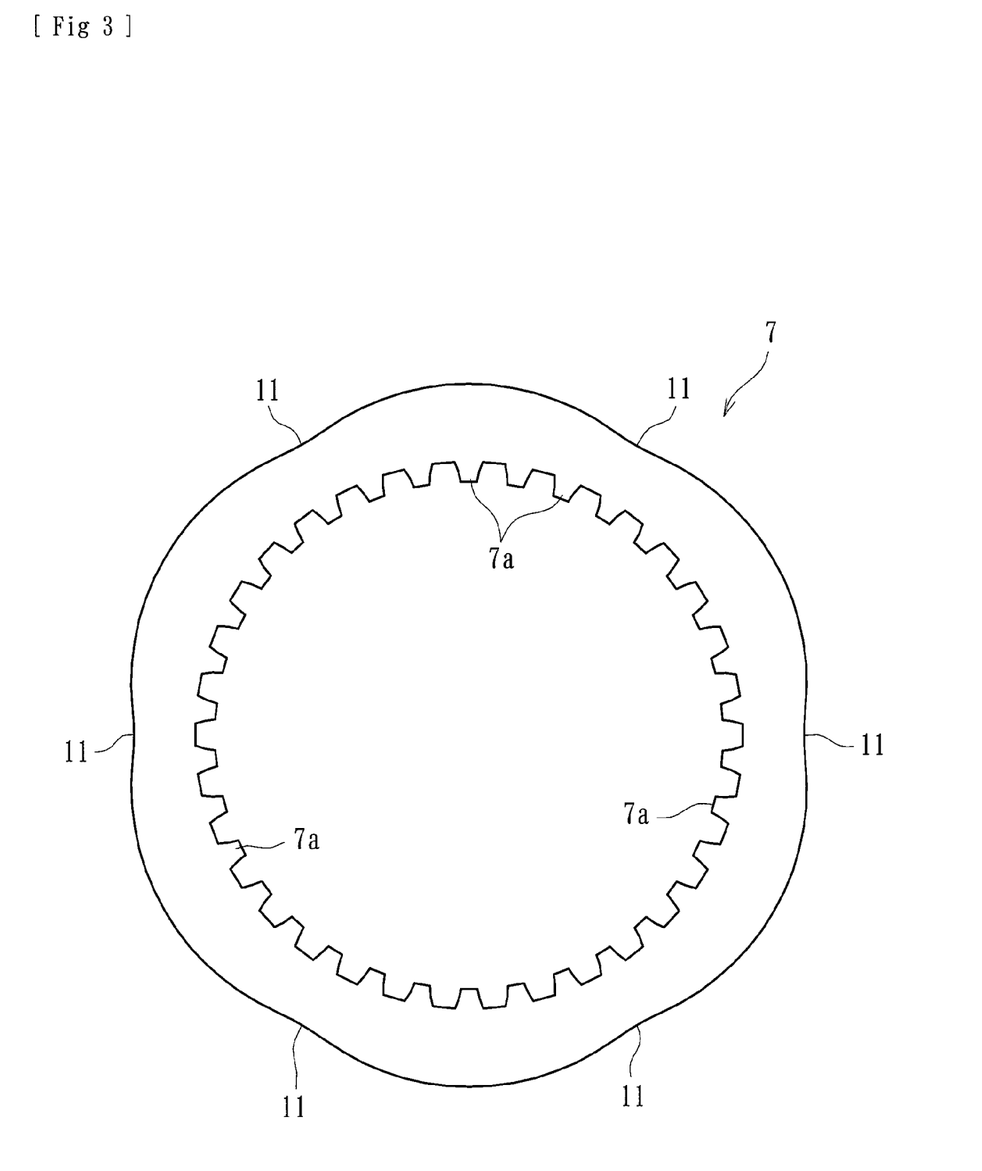
FIG. 3 is a plan view showing a clutch plate of the multiple disc clutch apparatus of FIG. 1.

The clutch plates 7 can be (e.g., configured to be) alternately laminated with (e.g., interleaved with) the clutch discs 6 so that adjacent plates 7 and discs 6 can be press-contacted with and separated from each other. As shown in FIG. 3, each of the clutch plates 7 can comprise a substantially annular metal sheet corresponding to the configuration of the clutch discs 6 and can be formed with multiple projections 7a on its inner circumference adapted to be spline fitted with the splines of the clutch member 4. This can enable the clutch plates 7 to rotate together with the clutch member 4 and to slide axially therealong.

In some embodiments, the clutch discs 6 and the clutch plates 7 can be slid along the clutch housing 2 and the clutch member 4, respectively, and thus can transmit the driving power of the clutch housing 2 to the clutch member 4 and the shaft 3 when they are press-contacted with each other by the presser 5. On the contrary, the transmission of the driving power of the clutch housing 2 to the shaft 3 can be blocked when pressing force of the presser 5 is released.

Figure 2:
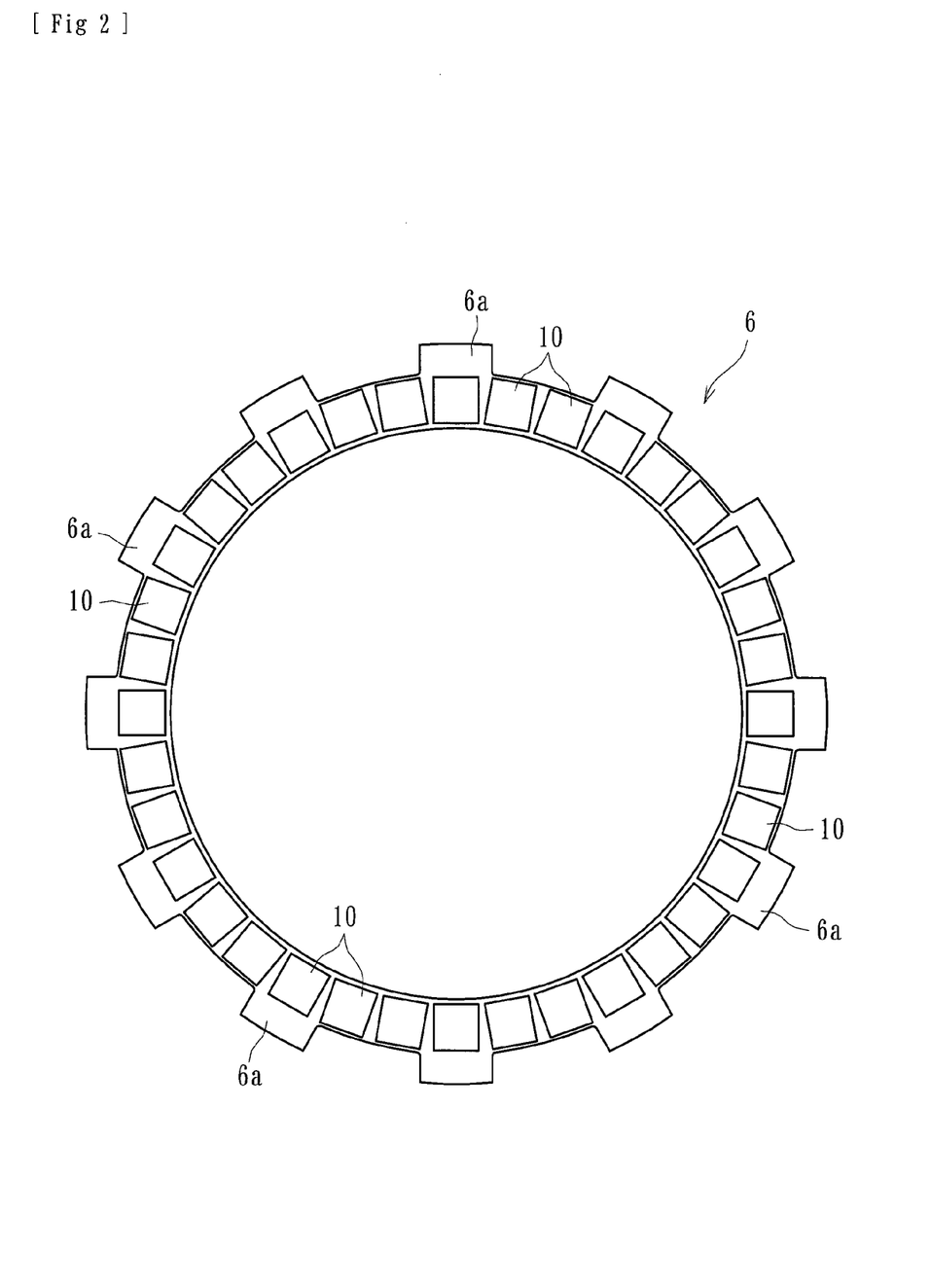
FIG. 2 is a plan view showing a clutch disc of the multiple disc clutch apparatus of FIG. 1.

As shown in FIG. 2, frictional members 10 having a large frictional resistance (e.g., constructed from a cork material or some other high-friction material) can be secured on surfaces (e.g., both surfaces) of the clutch discs 6 opposing the clutch plates 7. In some embodiments, the frictional members 10 comprise multiple rectangular members secured on surfaces of the clutch discs 6 opposing the clutch plates 7 separately from each other at a predetermined distance so as to discharge oil between the clutch disc 6 and the clutch plate 7 through separated spaces between the frictional members 10. The driving power can be transmitted between the engine and the wheel (or wheels) by the press-contact between the clutch discs 6 and the clutch plates 7 via the frictional members 10. The driving power can be blocked between the engine and the wheel (or wheels) when the press-contacting force is released.

In this specification, the term "separation" of the clutch discs 6 and the clutch plates 7 does not necessarily mean a condition whether any clearance is caused between them. Accordingly, it includes a condition in which the clutch member 4 cannot follow the rotation of the clutch housing 2 (e.g., due to slippage between the clutch discs 6 and the clutch plates 7).

The presser 5 can have a substantially disc-shaped configuration adapted to close an opening (e.g., the right end in FIG. 1) of the clutch member 4 and can be normally urged toward the left (e.g., in the frame of reference of FIG. 1) by clutch springs S. In some embodiments, the presser 5 can be normally urged toward the left by clutch springs S interposed between hollow bosses 4b of the clutch member 4 and heads of clutch bolts B screwed in the bosses 4b.

In some embodiments, the peripheral part 5a of the presser 5 abuts against the rightmost part (e.g., in the frame of reference of FIG. 1) of the lamination of the clutch discs 6 and the clutch plates 7 and can press-contact them to each other by the urging force of the clutch springs S. In some embodiments, the clutch housing 2 and the clutch member 4 are kept in normally connected condition so that the shaft 3 can be rotated whenever the rotational power is inputted to the gear 1.

An axially extending push rod 9 can be inserted into the hollow shaft 3 so that the push rod 9 can shift the presser 5 toward the right (e.g., in the frame of reference of FIG. 1) against the urging force of the clutch springs S by operating an operating mechanism (e.g., an operating means) (not shown). When the presser 5 is shifted toward the right (e.g., in the frame of reference of FIG. 1), the press-contacting force between the clutch discs 6 and the clutch plate 7 can be released and thus the rotational power inputted to the gear 1 and the clutch housing 2 can be blocked. In some configurations, the presser 5 is structured so that it can press-contact and/or release the clutch discs 6 and clutch plates 7 with or from each other due to its axially movement relative to the clutch member 4.

The presser 5 can be integrally formed with a projected stopper 5b for limiting rotation of the presser 5 relative to the clutch member 4. The stopper 5b can extend from the presser 5 toward the left (e.g., in the frame of reference of FIG. 1) and can be fitted into a recess 4a formed on the inner circumferential wall of the clutch member 4 to limit relative rotation between the presser 5 and the clutch member 4.

Figure 4:
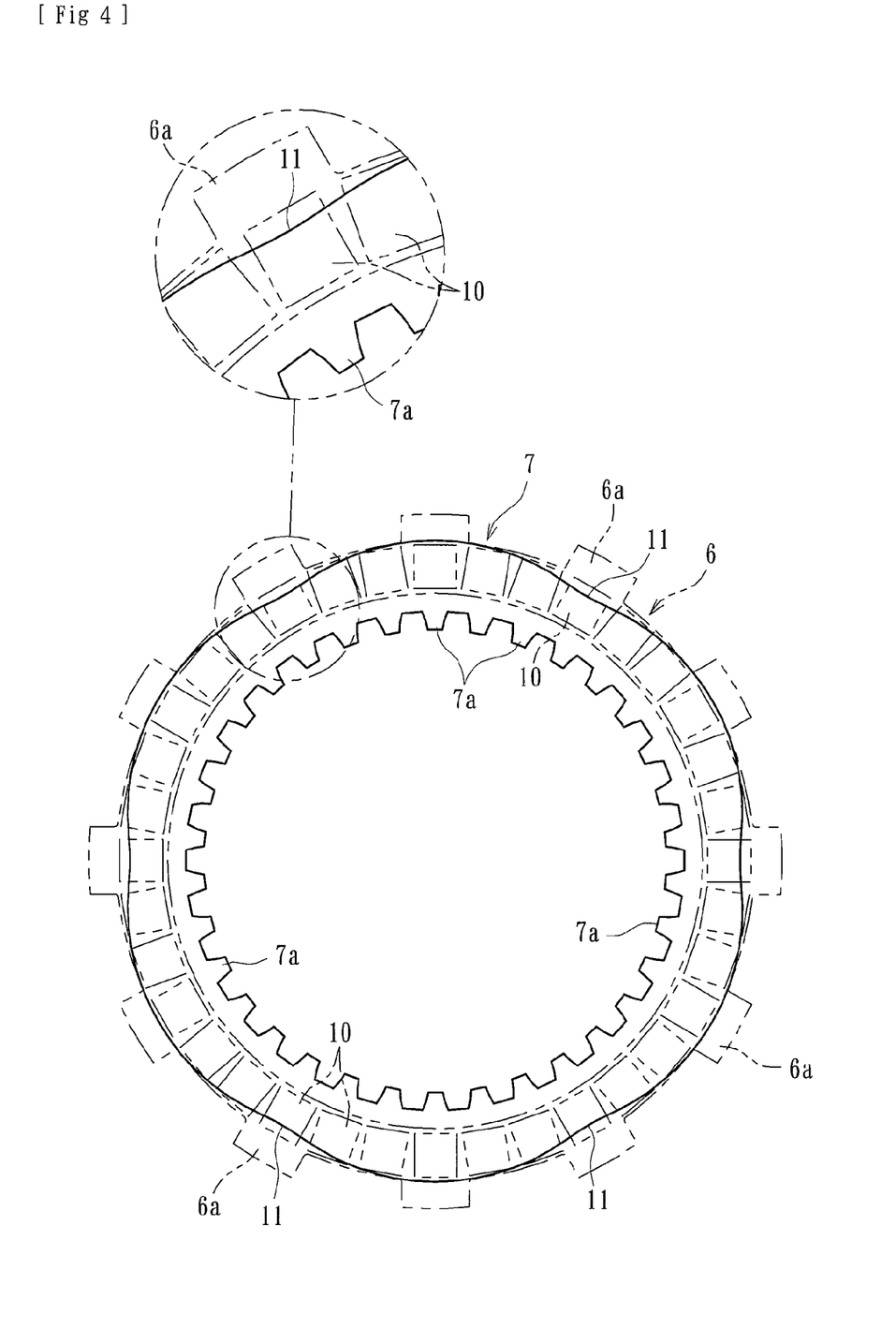
FIG. 4 is a plan view showing a stacked condition of the clutch disc and the clutch plate of the multiple disc clutch apparatus of FIG. 1.

As shown in FIGS. 3 and 4, each of the clutch plates 7 can be formed with depressions 11 extending along its periphery and radially inward therefrom. In some embodiments, a part of the frictional members 10 can be positioned within a region of the depressions 11 when the clutch disc 6 is stacked on (e.g., interleaved with, alternatively laminated with) the clutch plate 7 (e.g., at least a portion of at least one frictional member 10 can overlap at least a portion of one or more depressions 11 in a radial direction with respect to the shaft 3). In FIG. 4, it is shown that the frictional members 10 can be exposed through the depression 11. The clutch plates 7 may be formed by punching out metal sheets (e.g., blank members) to a configuration shown in FIG. 3.

Accordingly, relatively large spaces including parts of the frictional members 10 can be formed at portions of the depressions 11 between the stacked clutch discs 6 and clutch plates 7 and thus oil caught between them can be more easily discharged outside. Accordingly, since much more oil can be discharged outside through the spaces including depressions 11 before and while the clutch discs 6 and the clutch plates 7 are rotated relative to each other, it is possible to more effectively reduce the drag torque and the sticking torque. Additionally, provision of the depressions 11 contributes to reduction of weight of the clutch plates 7 and thus of the multiple disc clutch apparatus since depressions are formed by cutting out the clutch plate 7 along the periphery of the clutch plate 7 and radially inward therefrom.

Each of the depressions 11 can have a configuration of a curved notch (e.g., configuration of a continuous curved line having various radii of curvature in the plan view of the clutch plate 7). The depressions 11 of curved notches can reduce the likelihood that the frictional members 10 are caught by the depressions and can achieve smooth rotation of the clutch discs 6 and the clutch plates 7 when the clutch disk 6 and the clutch plate 7 are relatively rotated.

In some embodiments, since the depressions 11 are multiple notches (e.g., six notches in the illustrated example) arranged equidistantly along the whole periphery of the clutch plate 7, it is possible to discharge more oil and maintain good circumferential weight balance of the clutch plates 7 for stable rotation thereof. Increase of the number of the notches (e.g., depressions 11) can contribute to reduction of the weight of the clutch plates 7 and thus of the multiple disc clutch apparatus since the overall weight is reduced by the weight of cut-out regions.

Then, results of a following experiment will be described for demonstrating the technological superiorities of the multiple disc clutch apparatuses of the present inventions.

Clutch plates in which multiple depressions 11 are formed along the whole periphery of each clutch plate were compared to clutch plates each having a substantially annular configuration. Then, clutch discs were stacked respectively with the clutch plates of the present inventions and those of the comparative sample, press-contacted to each other and integrally rotated, and finally relatively rotated after having released the press-contacting force.

Figure 5:
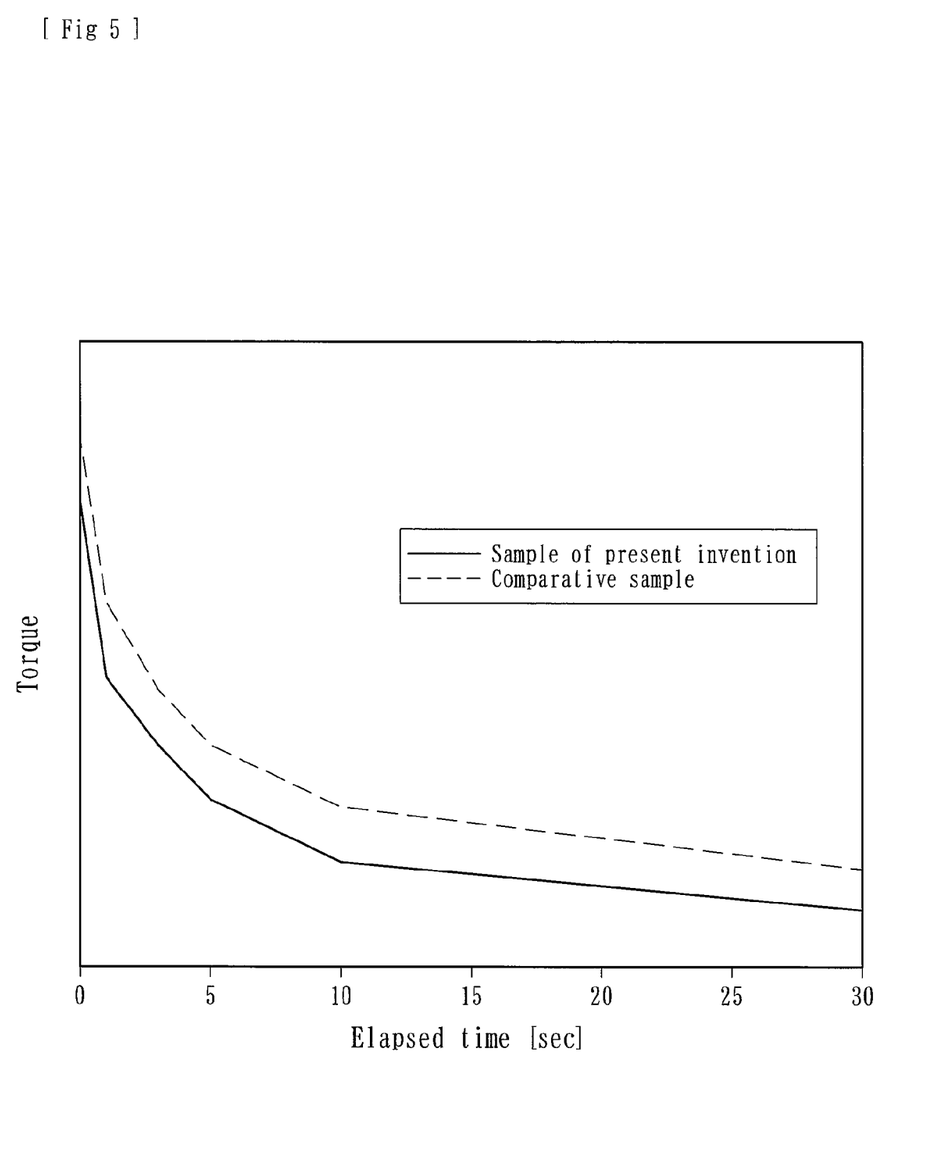
FIG. 5 is a graph showing experimental results exhibiting technical superiorities of the multiple disc clutch apparatus of FIG. 1.

Results of the experiment are shown in the graph of FIG. 5 in which the horizontal axis shows an elapsed time (sec) from a point of time in which the press-contacting force is released (e.g., a point of time just before the relative rotation of the clutch discs and the clutch plates), and the vertical axis shows a torque between the clutch discs and the clutch plates. As can be seen from this graph, the torque at the elapsed point of time (e.g., t=0) (e.g., sticking torque), as well as the torque at the elapsed point of predetermined time (t>0) (e.g., drag torque) of the sample of the present invention are lower than those of the comparative sample. It can be surmised that the provision of the depressions 11 on the clutch plates 7 of the sample of the present invention enables formation of relatively large space relative to adjacent clutch discs 6 and thus larger amount of oil can be discharged outside than that of the comparative sample.

As described above, since, in some embodiments, depressions 11 are formed on each clutch plate 7 extending along its periphery and toward radially inward therefrom, and a part of the frictional members 10 is positioned within a region of the depressions 11, it is possible to reduce both the drag torque and the sticking torque and simultaneously reduce the weight of the multiple disc clutch apparatus.

In some embodiments, since the frictional members 10 comprise multiple rectangular members secured on surfaces of the clutch discs 6 opposing to the clutch plates 7 separately from each other at a predetermined distance so as to discharge oil between the clutch disc 6 and the clutch plate 7 through separated spaces between the frictional members 10, it is possible to discharge larger amount of oil through separated spaces between the frictional members cooperating with the oil discharging effect of the depressions 11, and thus to further reduce the drag torque and the sticking torque.

Figure 6:
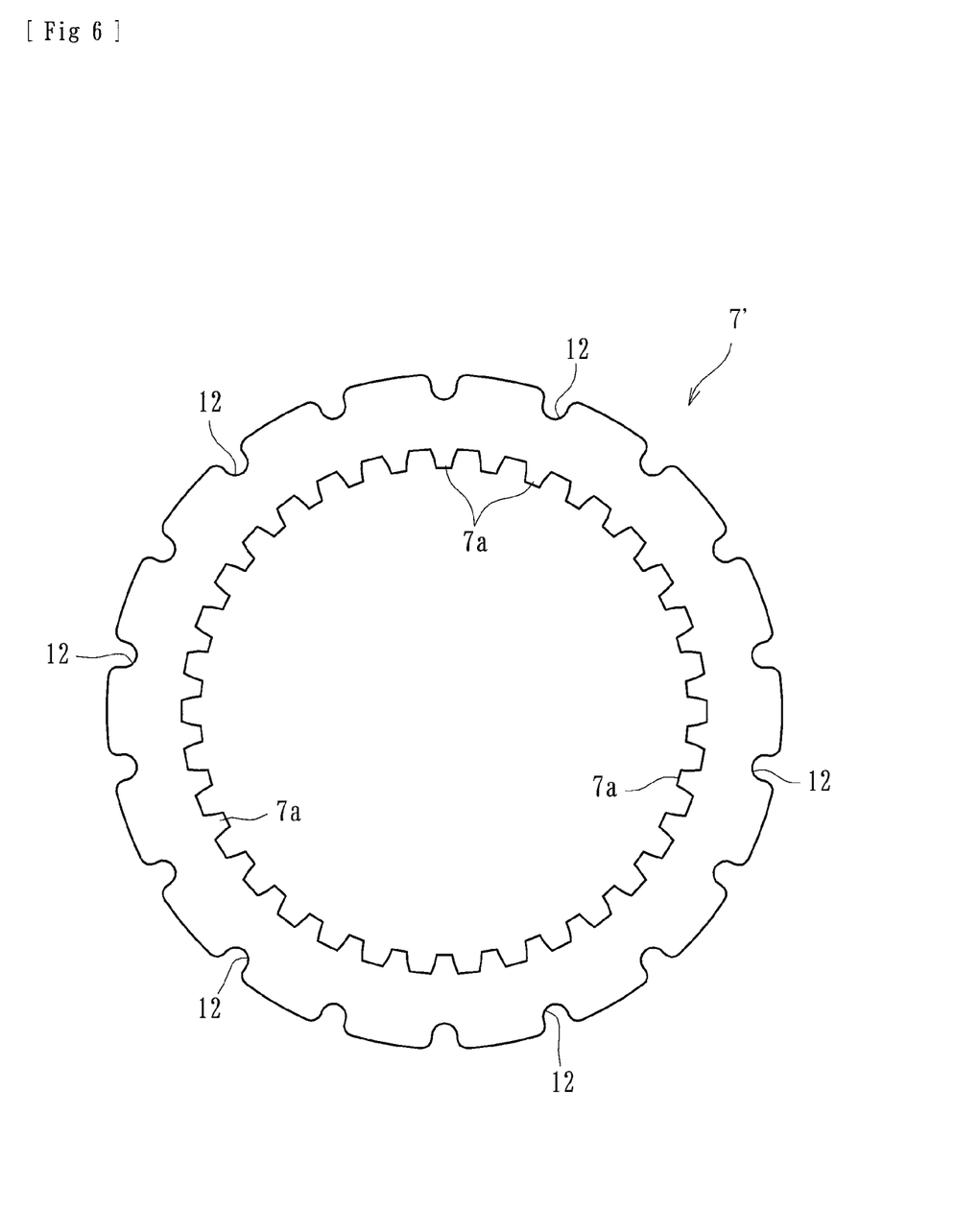
FIG. 6 is a plan view showing one modification of the clutch plate of FIG. 3.
Figure 7:
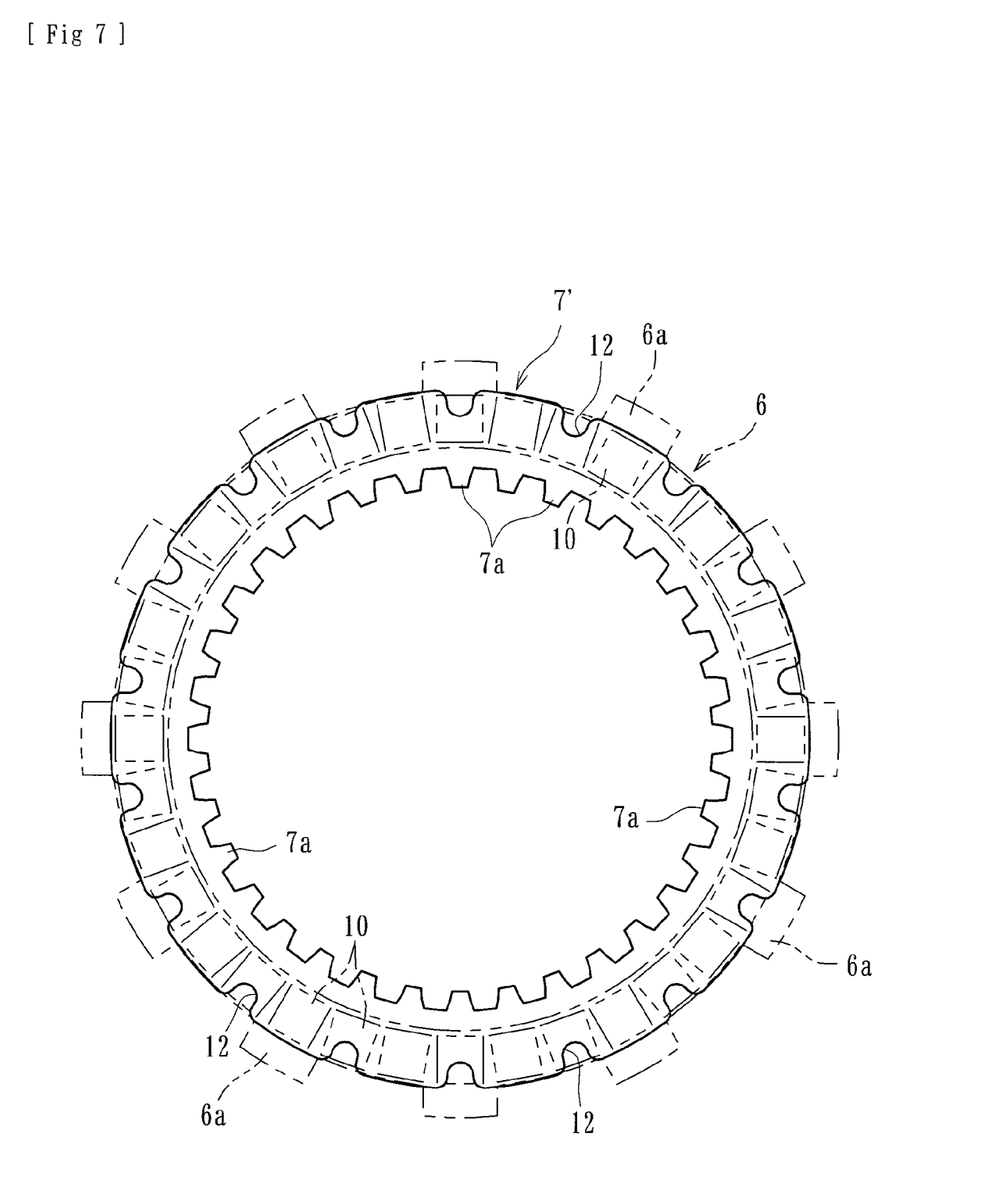
FIG. 7 is a plan view showing a stacked condition of the clutch disc and the clutch plate of FIG. 6.
Figure 8:
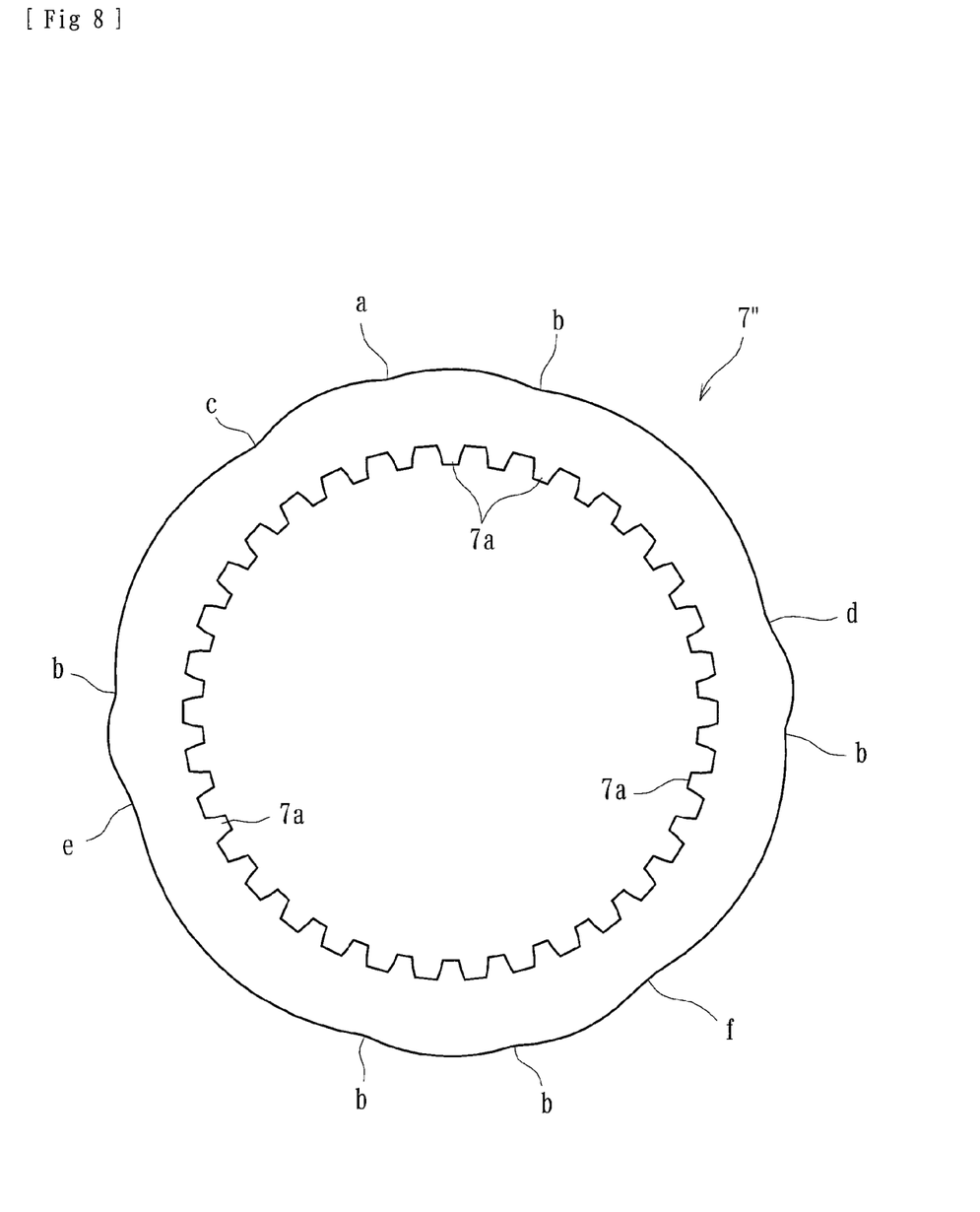
FIG. 8 is a plan view showing a clutch plate of another modification of FIG. 6.
Figure 9:
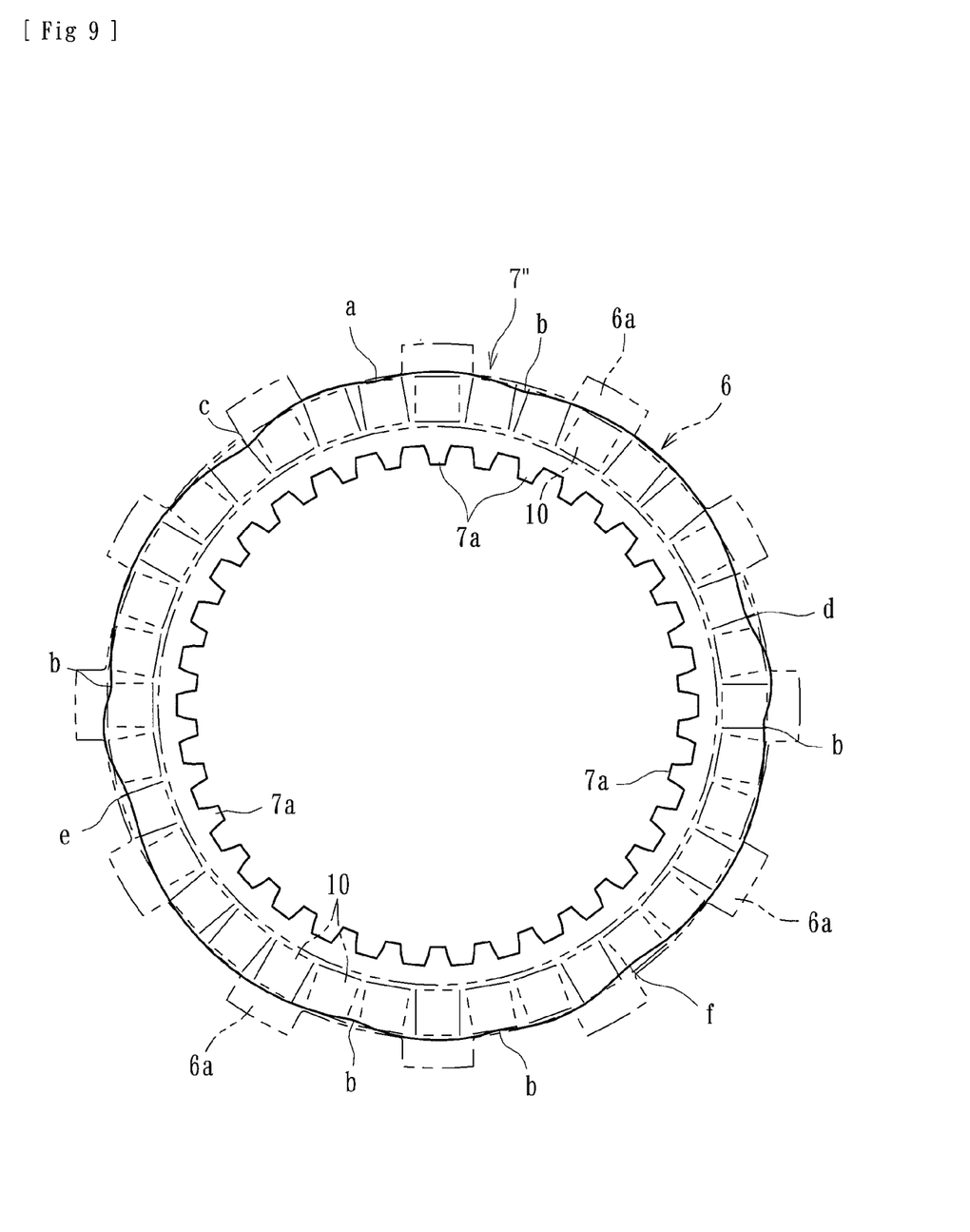
FIG. 9 is a plan view showing a stacked condition of the clutch disc and the clutch plate of FIG. 8.

The present inventions have been described with reference to the preferred embodiments described above. However, the present inventions are not limited to the illustrated and described embodiments, and other modifications can be adopted with respect to the depressions 11 formed on the clutch plate 7. For example it is possible to form substantially circular arc shaped depression 12 (e.g., the clutch plate 7' of FIGS. 6 and 7) or multiple depression a-f having different radii of curvature on each clutch plate which extends along its periphery and radially inward therefrom so that a part of the frictional members 10 is positioned within a region of the depressions 12 or a-f (e.g., the clutch plate 7" of FIGS. 8 and 9).

Although the depressions 11, 12, a-f described above are formed by curved notches, depressions having other configurations such as, for example, rectangular shape or other shapes may be possible. In addition, although it is shown that six depressions 11 are arranged equidistantly along the periphery of the clutch plate 7, arbitrary numbers of the depressions (e.g., 1, 2, 3, 4, 5, 7, or more) may be selected and the spacing of the depressions may be not equidistant.

Furthermore, although it has been described that the frictional members 10 are formed of rectangular cork material and secured on surfaces of the clutch discs 6 opposing the clutch plates 7 separately from each other at a predetermined distance, the frictional members may be annular and formed of material other than cork. In addition, the multiple disc clutch apparatus can be applied to vehicles other than two-wheel motorcycles (e.g., to three or four-wheeled buggies or general purpose machines using a multiple disc clutch apparatus).

The multiple disc clutch apparatus of the present inventions can be applied to those mechanisms having clutch plates in which depressions are formed on the periphery of the clutch plates and a part of the frictional members can be positioned within a region of the depressions when the clutch disks are stacked with the clutch plates, even if appearance or shape is different from the illustrated embodiments or other functions are added to the illustrated embodiments.

What is claimed is:
1. A multiple disc clutch apparatus comprising:
substantially annular multiple clutch discs connected to an input-side from an engine;
substantially annular multiple clutch plates alternately laminated with the clutch discs and connected to an output-side to a wheel; and
frictional members secured on surfaces of the clutch discs opposing the clutch plates and adapted to be capable of press-contacting with or separating from the clutch plates;
a power from the engine being transmitted to the wheel when the clutch discs and the clutch plates are press-contacted to each other via the frictional members and the power transmission between the engine and the wheel being blocked by releasing the press-contacting force characterized in:
that multiple depressions having different radii of curvature are formed on each clutch plate extending along its periphery and radially inward therefrom; and that a part of the frictional members is positioned within a region of the depressions when the clutch plates are alternately laminated with the clutch discs.

2. The multiple disc clutch apparatus of claim 1 wherein each of the depressions has a configuration of a curved notch.

3. The multiple disc clutch apparatus of claim 2 wherein the frictional members comprise multiple rectangular members secured on surfaces of the clutch discs opposing the clutch plates separately from each other at a predetermined distance so as to discharge oil between the clutch disc and the clutch plate through separated spaces between the frictional members.

4. The multiple disc clutch apparatus of claim 1 wherein the frictional members comprise multiple rectangular members secured on surfaces of the clutch discs opposing the clutch plates separately from each other at a predetermined distance so as to discharge oil between the clutch disc and the clutch plate through separated spaces between the frictional members.

5. A multiple disc clutch apparatus comprising:
   substantially annular multiple clutch discs connected to an input-side of the apparatus configured to receive input from an engine and to rotate about an axis of rotation upon receipt of input from the engine;
   substantially annular multiple clutch plates interleaved with the clutch discs, the clutch plates connected to an output-side of the apparatus configured to output to a wheel; and
   frictional members secured on surfaces of the clutch discs opposing the clutch plates and capable of press-contacting with or separating from the clutch plates;
   wherein a power from the engine is transmitted to the wheel when the clutch discs and the clutch plates are press-contacted to each other via the frictional members and wherein the power transmission between the engine and the wheel is disconnected by releasing a press-contacting force; and
   wherein;
      multiple depressions having different radii of curvature are formed on each clutch plate extending along its periphery and extending radially inward from the periphery; and
      a part of at least one of the frictional members overlaps one or more of the depressions in a radial direction with respect to the axis of rotation of the clutch disc when the clutch plates are interleaved with the clutch discs.

6. The multiple disc clutch apparatus of claim 5 wherein each of the depressions has a configuration of a curved notch.

7. The multiple disc clutch apparatus of claim 6 wherein the frictional members comprise multiple rectangular members secured on surfaces of the clutch discs opposing the clutch plates separately from each other at a predetermined distance so as to discharge oil between the clutch disc and the clutch plate through separated spaces between the frictional members.

8. The multiple disc clutch apparatus of claim 5 wherein the frictional members comprise multiple rectangular members secured on surfaces of the clutch discs opposing the clutch plates separately from each other at a predetermined distance so as to discharge oil between the clutch disc and the clutch plate through separated spaces between the frictional members.

\* \* \* \* \*